(12) United States Patent
Stein

(10) Patent No.: US 6,401,335 B1
(45) Date of Patent: Jun. 11, 2002

(54) RADIATOR MOUTH REPAIR KIT

(76) Inventor: Myron Stein, 2974-D Askkay Dr., Smyrna, GA (US) 30082

( * ) Notice: Subject to any disclaimer, the term of this patent is extended or adjusted under 35 U.S.C. 154(b) by 263 days.

(21) Appl. No.: 08/960,753

(22) Filed: Oct. 29, 1997

(51) Int. Cl.[7] .............................................. B23P 15/00
(52) U.S. Cl. .............................................. 29/890.031
(58) Field of Search ................... 29/890.031, 402.06, 29/402.08, 402.11, 402.18

(56) References Cited

U.S. PATENT DOCUMENTS

| | | | |
|---|---|---|---|
| 4,310,182 A | 1/1982 | Vandenbossche | 285/40 |
| 4,697,634 A | 10/1987 | Foucher et al. | 165/76 |
| 4,773,474 A | 9/1988 | Stay | 165/76 |
| 4,896,718 A | 1/1990 | Trin | 165/141 |
| 4,930,568 A | 6/1990 | Janezich et al. | 165/76 |
| 5,169,178 A | 12/1992 | Hunzinger | 285/26 |
| 5,344,064 A * | 9/1994 | Stokes et al. | 29/890.031 |
| 5,363,541 A * | 11/1994 | Toomey et al. | 29/402.11 |
| 5,437,086 A * | 8/1995 | Murphree | 29/402.11 |
| 5,522,453 A | 6/1996 | Green | 165/41 |
| 5,809,632 A * | 9/1998 | Champagne et al. | 29/890.031 |

* cited by examiner

*Primary Examiner*—I Cuda Rosenbaum
(74) *Attorney, Agent, or Firm*—Womble Carlyle Sandridge & Rice

(57) ABSTRACT

A method of repairing the broken-off overflow tube nipple of a radiator mouth assembly is provided. The method comprises the steps of preparing the broken-off end portion of the overflow tube nipple by removing a predetermined amount of the end portion until the end portion becomes substantially flat and smooth. A replacement overflow tube nipple is then installed in the prepared end portion of the broken-off nipple to complete the repair.

15 Claims, 3 Drawing Sheets

RADIATOR MOUTH REPAIR KIT

TECHNICAL FIELD

The present invention relates generally to automotive repair and more particularly to the repair of radiators and specifically the repair of broken mouth assemblies of radiators.

BACKGROUND OF THE INVENTION

Automotive engines are provided with radiators through which the engine coolant is pumped to cool it after it has absorbed heat from the engine. In most cases, these radiators comprise an array of cooling fins through which coolant tubes extend and are located at the front of a vehicle. Thus, wind passing through the cooling fins of the radiator efficiently cools the liquid coolant as it passes through the coolant tubes. In addition, radiators are also provided with a reservoir for holding engine coolant. The reservoir, in turn, is provided with a mouth assembly through which coolant can be added to the system. In general, the mouth assembly of a radiator has a generally tubular configuration with an open top end through which coolant can be added to the reservoir. The open top end is configured to receive a sealing cap to close the mouth and seal off the radiator reservoir. The radiator cap is provided with a spring biased gasket that can be overcome when pressure within the reservoir rises above a predetermined level to allow excess pressure and coolant to escape from the reservoir. The spring biased gasket also allows excess water to escape from the reservoir as the water is heated and expanded in volume during normal operation of the engine.

In recent years, radiator mouth assemblies in vehicles have been provided with overflow tube nipples that project outwardly from the tubular body of the mouth assembly. These overflow tube nipples, in turn, are coupled to one end of a flexible overflow hose, which communicates at its other end with an ancillary reservoir within the engine compartment. When coolant escapes from the radiator reservoir, it is delivered through the overflow tube nipple and the flexible overflow hose into the ancillary reservoir. In this way, the coolant is not lost from the system and can be drawn back into the radiator as needed.

In the last few years, radiator reservoirs and their mouth assemblies have been formed of molded plastic rather than copper or other metals that were previously used. The molded plastic is more economical than metal and does not have to be soldered at critical joints as with metal. Accordingly, the molded plastic reservoirs are more reliable than the old metal reservoirs.

One problem with molded plastic radiator reservoirs and their plastic mouth assemblies has been related to the overflow tube nipple that projects outwardly from the tubular body of the mouth assembly and receives an end of the overflow hose. In plastic mouth assemblies, it is not uncommon for these overflow nipples to become brittle and to be broken-off during normal maintenance procedures on the engine. Once broken-off, the overflow tube nipple will not receive the end of the overflow hose in a sealing manner and coolant can leak from the system. In the past, when an overflow tube nipple was broken-off in this manner, the entire radiator reservoir and its mouth assembly had to be replaced since they are all molded as a unitary plastic element. Obviously, such replacement is time consuming and expensive and results in unexpected repair cost when an overflow tube nipple is accidentally broken-off.

Accordingly, there exists a need for a method of repairing the broken-off overflow tube nipple of a plastic radiator mouth assembly without the necessity of removing and replacing the entire radiator reservoir. It is to the provision of such a method and to a kit for performing the method that the present invention is primarily directed.

SUMMARY OF THE INVENTION

Briefly described, the present invention, in a preferred embodiment thereof, comprises a method of repairing the broken-off overflow tube nipple of a radiator mouth assembly without the necessity of replacing the entire radiator reservoir. The method is intended for repairing broken-off overflow tube nipples of plastic radiator assemblies; however, it may also be applied to radiator mouth assemblies made of metal or other materials. The method comprises the steps of preparing the broken-off end portion of the overflow tube nipple by removing a predetermined amount of the end portion until the resulting end of the nipple becomes substantially flat and smooth. In one embodiment, a sufficient amount of the nipple is removed so that the resulting flat smooth surface is substantially flush with the tubular body of the radiator mouth assembly. In another embodiment, a predetermined amount of the broken-off end portion of the nipple is removed so that the remaining stub of the nipple projects a predetermined distance from the body portion of the radiator mouth assembly.

Once the broken-off end portion of the overflow tube nipple has been prepared, the method includes the further step of installing a replacement overflow tube nipple in the prepared end portion for affecting the repair and for receiving the end of an overflow hose. In a first embodiment, this is accomplished by inserting a threaded annular boss through the prepared overflow tube nipple from the inside of the mouth assembly until the threaded portion of the boss protrudes from the assembly. A replacement overflow tube nipple is then threaded onto the protruding threaded portion of the boss. At least one gasket in the form of a rubber O-ring is positioned between the replacement overflow tube nipple and the prepared flat smooth end of the broken-off nipple and the replacement nipple is tightened against the gasket. This prevents leakage of coolant from the repaired area.

In a second embodiment, the prepared stub of the broken-off nipple is internally threaded with a tap and a replacement nipple having external threads is threaded into the tapped prepared nipple. The replacement nipple is provided with a shoulder and a gasket in the form of a rubber O-ring is positioned between the shoulder and the flat smooth prepared end of the broken-off nipple to prevent leaks from the prepared area.

In each case, the repair is completed quickly and easily and at a minimum of cost. When the replacement nipple has been attached to the radiator mouth assembly, the overflow hose is attached to the replacement nipple and the repair is complete.

Thus, it is an object of this invention to provide a method of repairing the broken-off overflow tube nipple of a radiator mouth assembly that is quick, easy, and economical to perform.

Another object of the invention is to provide a method of repairing the broken-off overflow tube nipple of a radiator mouth assembly that eliminates the need to replace the entire radiator reservoir and mouth assembly when the original overflow tube nipple is broken.

A further object of the invention is to provide a kit that can be used by automotive repair persons to repair the broken-off overflow tube nipple of a radiator mouth assembly quickly and easily when the nipple is accidentally broken-off.

An additional object of the invention is to provide a repair method for overflow tube nipples of radiator mouth assemblies that is so easy, efficient, and economical that additional and unexpected repair bills to customers can be avoided.

These and other objects, features, and advantages of the present invention will become more apparent upon review of the detail descriptions set forth below when taken in conjunction with the accompanying drawings, which are briefly described as follows.

DETAILED DESCRIPTION OF THE PREFERRED EMBODIMENTS

Figure 1:
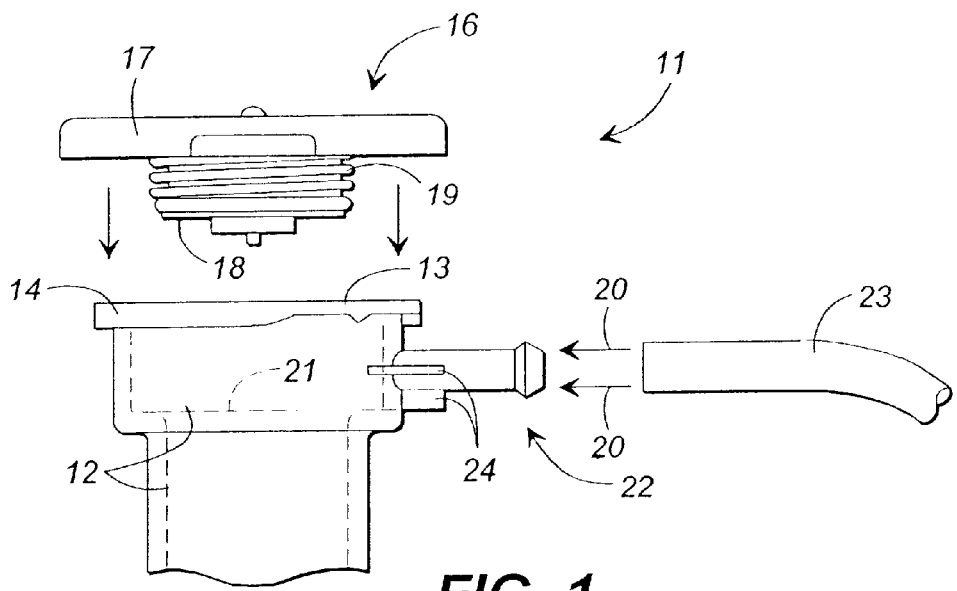
FIG. 1 is a side elevational partially exploded view of a typical molded plastic radiator mouth assembly illustrating a common overflow tube nipple configuration.

Referring now in more detail to the drawings, in which like numerals refer to like parts throughout the several views, FIG. 1 illustrates a typical modern radiator mouth assembly formed primarily of molded plastic. The assembly 11 comprises a radiator mouth having a tubular body portion 12, an open top 13 for receiving coolant to replenish the reservoir, and a contoured rim 14 for receiving a radiator cap 16. The radiator cap 16 typically is formed of metal and has a top 17 that is configured to be tightened onto the rim 14 of the assembly 11. The cap 16 is further provided with a gasket 18, typically of rubber, that is downwardly biased by a coil spring 19. The interior of the tubular body portion 12 is formed with an internal shoulder 21, illustrated in phantom lines in FIG. 1. When the radiator cap 16 is inserted into the open top 13 of the body portion 12 and rotated, the top 17 locks into place on the rim 14 with the gasket 18 being spring biased into engagement with the shoulder 21 within the body portion 12. This functions to seal off the radiator reservoir.

The tubular body portion 12 is further formed with an overflow tube nipple 22 that communicates with the upper portion of the tubular body and projects transversely therefrom. Plastic radiator mouth assemblies generally are formed with support ribs 24, which function to support the overflow tube nipple 22 and prevent it from bending and flexing under the stress of operation. The end of the overflow tube nipple 22 is configured to receive an overflow hose 23, which couples the tube 22 to an auxiliary coolant reservoir (not shown). The overflow hose 23 is coupled to the nipple 22 by being inserted over the end portion thereof as illustrated by arrows 20.

In normal operation of an engine, coolant within the radiator reservoir is heated by absorbing heat from the engine. As the coolant is heated, it expands within the reservoir. The expanding coolant forces the gasket 18 upwardly and out of sealing engagement with the shoulder 22, allowing coolant to escape into the upper portion of the tubular body 12. This excess coolant, then, is delivered to the auxiliary reservoir by flowing through the overflow tube nipple 22, through the overflow hose 23, and into the auxiliary reservoir. As the engine as coolant cools after operation, the contracting coolant within the reservoir draws the excess coolant back from the auxiliary reservoir into the radiator reservoir. In this way, a closed system is formed and radiator coolant is not lost as a result of expansion and contraction of the coolant. In addition, should the engine and coolant overheat, the resulting steam and pressure can also escape by pressing the gasket up and being delivered to the auxiliary reservoir in the same way.

Figure 2:
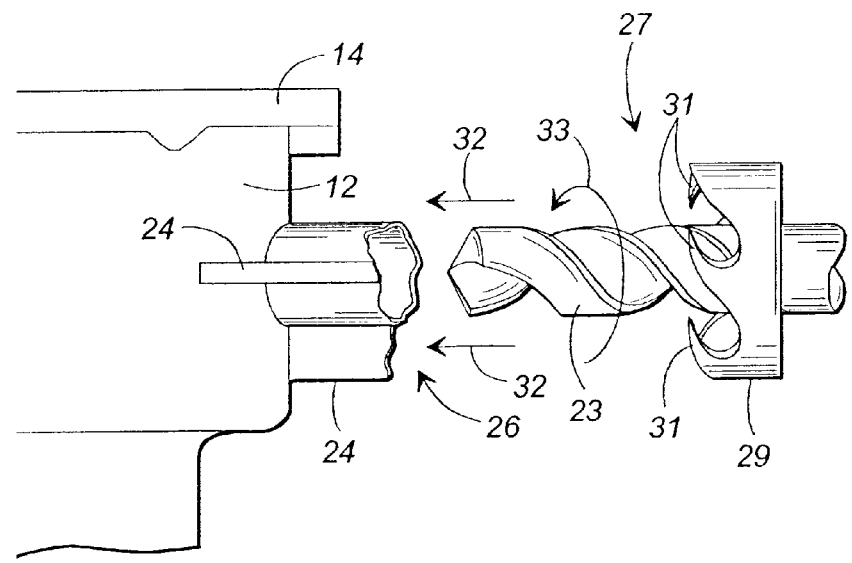
FIG. 2 illustrates a radiator mouth assembly having a broken-off overflow tube nipple and also illustrates the step of preparing the broken-off end according to the method of the present invention.

FIG. 2 illustrates the problem to which the present invention is directed and also illustrates one of the steps of the process of this invention. It is not uncommon, during normal maintenance of an engine, that a mechanic inadvertently breaks off the overflow tube nipple 22 extending from the radiator mouth assembly. This can be a particularly acute problem with older vehicles in which the plastic of the mouth assembly may have become brittle over time. The result is a jagged broken-off end 26, which, in many cases, extends into the region of the support ribs 24. As a result, the overflow hose 23 cannot be inserted onto the overflow tube nipple in such a way that a seal is formed therebetween. The system then becomes useless for its intended purpose and the broken-off overflow tube nipple must be replaced or repaired. In the past, this has been accomplished by replacing the entire radiator reservoir since the reservoir, reservoir mouth, and overflow tube nipple are formed of a unitary piece of molded plastic. As mentioned above, this has resulted in delays and unexpected repair cost for owners.

The method of the present invention comprises, first, preparing the broken-off end 26 of the overflow tube nipple to shape it into a flat relatively smooth configuration. This is accomplished, in a preferred embodiment, with a preparation tool 27. The tool 27 comprises a shank 28 having an outer diameter that is substantially the same as the inner diameter of the overflow tube nipple. In the preferred embodiment, the shank 28 comprises a common drill bit. However, the shank might also be simply a steel rod or take on another shape. The purpose of the shank 28 is to align the tool with the axis of the overflow tube nipple and a variety of shank shapes might accomplish this goal.

A cutter head 29 is secured on the shank 28 at a position spaced from its end. The cutter head 29 is formed of a hardened metal and is provided with an array of cutter blades or teeth 31 that are sharpened and formed on one side of the cutter head 29. The cutter head is firmly secured on the shank 28 so that, as the shank rotates, the cutter head is also rotated. The teeth 31 are designed and sharpened so that they cut away the plastic of the overflow tube nipple in a smooth and ordered way in order to form a substantially flat smooth end on the broken-off overflow tube nipple. It will be understood that while a particular configuration of the teeth 31 and cutter head 29 are shown in FIG. 2, a variety of configurations are possible and all such configurations should be deemed within the scope of the present invention. For example, the head could be formed with one or more slots that hold replaceable cutter blades, could be formed with spiral cutting surfaces, or could take on other configurations.

In using the tool 27 to prepare the broken-off end 26, the distal end of the shank 28 (not shown) is inserted into a drill and the proximal end is inserted into the broken-off end of the overflow tube nipple as illustrated by arrows 32. This functions to align the tool and the cutter head 29 axially with the overflow tube nipple. The drill is then activated to rotate the tool 27 and the cutter head 29 is pressed against the broken-off end of the overflow tube nipple. The teeth 31 on the cutter head 29 begin to cut away the material of the overflow tube nipple. This, in turn, removes material, shortens the nipple, and forms a substantially flat smooth end on the stub of the broken-off overflow tube nipple. When a predetermined amount of material is removed and a smooth flat end is formed, the tool 27 is extracted and the broken-off overflow tube nipple is prepared for the next step of the process.

Figure 3:
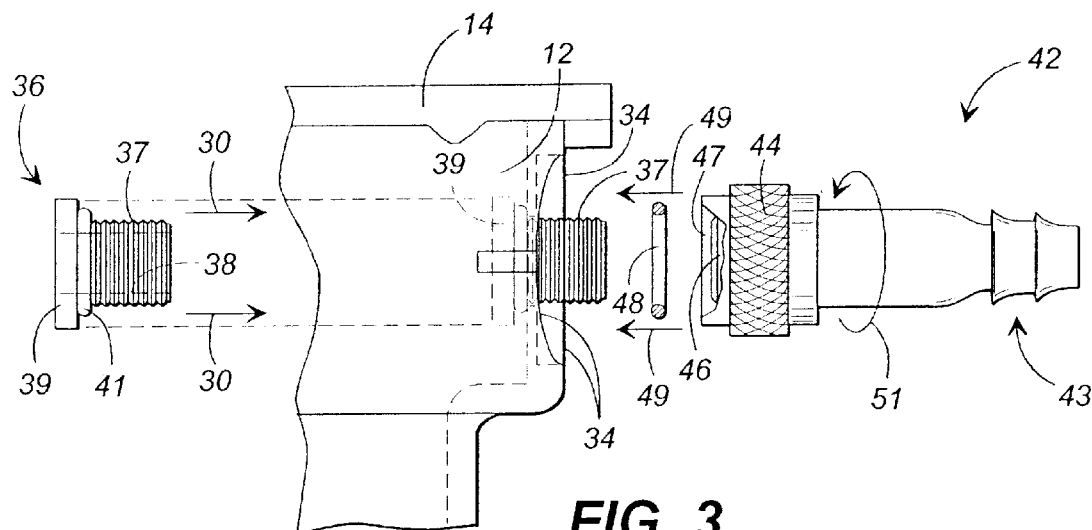
FIG. 3 illustrates a first embodiment of a replacement overflow tube nipple and its installation according to the present invention.

FIG. 3 illustrated a first embodiment of the next step of the method of this invention. In this embodiment, it can be seen that the broken-off overflow tube nipple has been prepared with the tool 27 by removing a sufficient amount of the nipple so that the resulting smooth flat end is substantially flush with the tubular body 12 of the radiator mouth. This produces in a flat smooth surface surrounding the opening to the tubular body as illustrated at 34 in FIG. 3. A boss 36 having external threads 37, an internal bore 38, and a radially projecting rim 39 is then inserted through the opening as illustrated by arrows 30 until the threads 37 project from the exterior surface tubular body 12. A gasket 41, which preferably is a rubber O-ring, is positioned between the rim 39 and the interior wall of the tubular body 12 to aid in sealing against leaks.

A replacement overflow tube nipple 42 having a fluted end portion 43, a knurled collar 44, and internal threads 46 is threaded onto the protruding end of the boss 36 as illustrated by arrows 49 and 51. The replacement nipple 42 is formed with an inwardly chamfered end 47 that rests adjacent to the flat smooth end 34 of the prepared broken-off nipple when the replacement nipple is threaded into place. A gasket 48, preferably in the form of a rubber O-ring, is positioned between the smooth flat end 34 and the replacement nipple 42. The gasket 48 surrounds the protruding end of the boss 36 and becomes captured between the smooth flat end of the prepared nipple and the inwardly chamfered end 47 of the replacement nipple. The O-ring thus becomes compressed against the smooth flat end 34 and the chamfered end 47, forming a seal that prevents coolant from leaking from the repair. this is one way in which the first step of the process is important because the smooth flat end that results from preparation with the tool 27 helps to form a seal against coolant leakage.

When the replacement nipple is installed and tightened, the overflow hose that originally was attached to the broken-off nipple is attached to the end of the replacement nipple and the repair is complete. The entire process is quick, efficient, and forms an air tight and water tight repair that functions in precisely the same way as the original overflow tube nipple.

Figure 4:
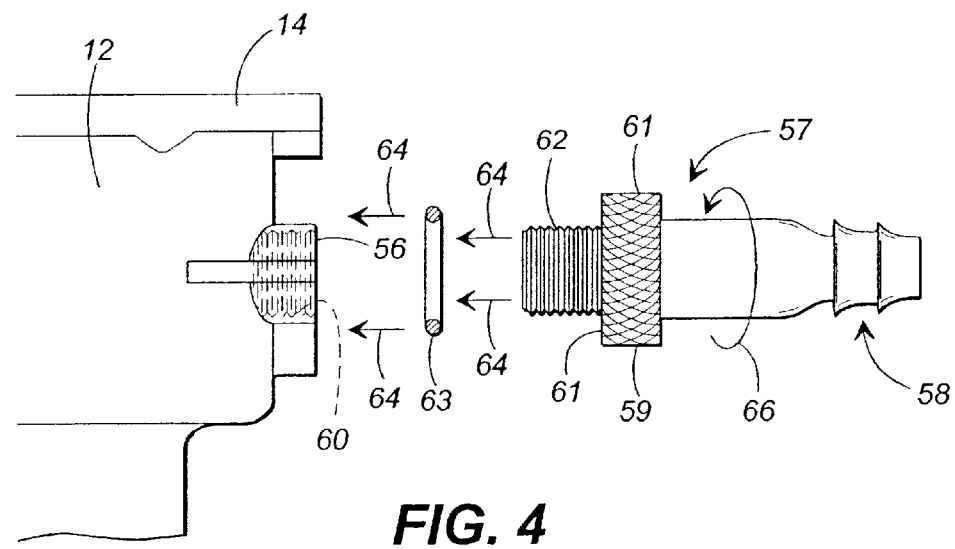
FIG. 4 illustrates a second embodiment of a replacement overflow tube nipple and its installation according to the present invention.

FIG. 4 illustrates a second embodiment of the process of this invention. In this embodiment, the broken-off overflow tube nipple is prepared by using the tool 27 in the same way as with the embodiment of FIG. 3. However, in this embodiment, a predetermined amount of the broken-off end portion of the nipple is removed so that the remaining portion or stub of the nipple projects a predetermined distance from the body portion of the radiator mouth assembly rather than being flush therewith as with the first embodiment. The result is a stub having a substantially flat smooth end 56.

The internal passageway 60 of the broken-off nipple is then threaded with an appropriate tap (not shown) to form internal threads therein. A replacement overflow nipple 57 having a fluted end 58, a knurled collar 59, and an externally threaded end 62 is then threaded into the threaded stub as illustrated by arrows 64 and 66. The knurled collar 59 forms an annular shoulder 61 on the replacement overflow nipple 57. A gasket 63, preferably in the form of a rubber O-ring, is positioned between the shoulder 61 and the flat smooth end 56 of the prepared broken-off nipple. As the replacement nipple 57 is threaded tightly into place, the gasket 63 becomes captured and compressed between the end 56 and the shoulder 61 to form a water tight seal against coolant leakage at the location of the repair. With the replacement overflow nipple 57 thus installed, the overflow hose can be inserted onto the fluted end 58 of the replacement nipple to complete the repair. As with the first embodiment, the method of this embodiment is also quick, efficient, and inexpensive and eliminates unnecessary repairs and repair costs.

Figure 5:
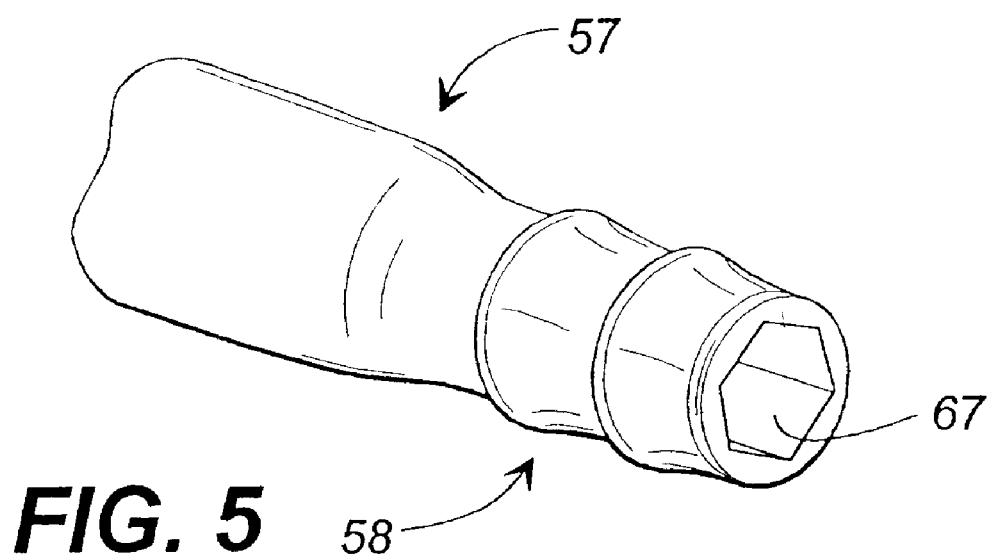
FIG. 5 illustrates a preferred configuration of the internal passageway of an overflow tube nipple configured according to the present invention.

FIG. 5 illustrates a preferred configuration of the internal passageway 67 of the repair nipple 57 for facilitating the method of this invention. The internal passageway 67 is seen to be shaped to receive a tightening tool for rotating the replacement overflow tube nipple to thread it into position on the tubular body portion of the radiator mouth assembly. In the preferred embodiment of FIG. 5, the internal passageway 67 is formed with a hexagonal cross section in order to receive a common alan wrench for rotating and tightening the replacement nipple 57. However, it will be clear to those of skill in the art that other configurations of the passageway 67 are possible for accommodating a wide variety of tightening tools. Accordingly, the hexagonal configuration shown in FIG. 5 as a preferred embodiment should not be considered a limitation of the present invention.

While this invention primarily encompasses a process or method of repairing a broken-off overflow tube nipple, it also contemplates a repair kit for carrying out this method. The repair kit comprises a tool for preparing the broken-off end portion of the overflow tube nipple of a radiator mouth assembly by removing a predetermined amount of the nipple until the end portion of the nipple becomes substantially flat and smooth. The kit further includes a replacement overflow tube nipple adapted to be installed in the prepared end portion of the broken-off overflow tube nipple. The replacement nipple is configured, when installed, to receive the end of an overflow hose to direct coolant to an auxiliary reservoir within the engine compartment. The kit can include, in one embodiment, a replacement overflow tube nipple that has a threaded annular boss for insertion through the prepared broken-off overflow tube nipple from the inside of the radiator mouth assembly until he threaded portion of the boss protrudes from the assembly. An internally threaded replacement nipple is then threaded onto the protruding end of the boss and tightened into place. Such a kit preferably would also include appropriate gaskets as illustrated and discussed above, a tap for forming internal threads in the broken-off overflow tube nipple, and a wrench, such as an alan wrench, for rotating and tightening the replacement nipple into place. A kit for performing the method illustrated in FIG. 4 would include a replacement nipple having one end provided with external threads for threading into the stub of the broken-off overflow tube nipple.

The invention has been described herein in terms of preferred embodiments and methodologies. It will be obvious to those of skill in the art, however, that various modifications might well be made to the illustrated embodiments without departing from the spirit and scope of the invention as set forth in the claims. Further, the components of this invention can be made from a variety of materials including brass, steel, aluminum, or plastic. All such materials as well as other variations are contemplated to be within the scope of the present invention.

What is claimed is:

1. A method of repairing a broken-off overflow tube nipple of a radiator mouth assembly, the nipple having a broken-off end portion, said method comprising the steps of:

(a) removing a predetermined amount of the broken-off end portion of the overflow tube nipple to form a prepared end portion that is substantially flat and smooth; and (b) installing a replacement overflow tube nipple in the prepared end portion for receiving the end of an overflow hose.

2. A method of repairing a broken-off overflow tube nipple of a radiator mouth assembly as claimed in claim 1 and wherein the radiator mouth assembly is generally tubular and has an open end for receiving coolant and a body portion from which the broken-off overflow tube nipple projects, and where in step a) a sufficient amount of the broken-off end portion is removed so that the substantially flat and smooth prepared end portion is substantially flush with the body of the radiator mouth assembly.

3. A method of repairing a broken-off overflow tube nipple of a radiator mouth assembly as claimed in claim 2 and wherein step b) comprises inserting a threaded annular boss through the prepared end portion until at least a portion of the threaded boss protrudes from the assembly and threading the replacement overflow tube nipple onto the protruding threaded portion of the boss.

4. A method of repairing a broken-off overflow tube nipple of a radiator mouth assembly as claimed in claim 3 and wherein said threaded annular boss has a radially projecting rim that bears against an inside wall of the body portion of the radiator mouth assembly and wherein step b) further comprises locating a gasket between the rim of the boss and the inside wall of the body portion of the radiator mouth assembly to seal against leakage of coolant.

5. The method of claim 4 and wherein the gasket is an O-ring.

6. A method of repairing a broken-off overflow tube nipple of a radiator mouth assembly as claimed in claim 3 and wherein step b) further comprises locating a gasket between the replacement overflow tube nipple and the prepared end portion of the broken-off overflow tube nipple and tightening the replacement nipple against the gasket to seal against coolant leakage.

7. The method of claim 6 and wherein the gasket is an O-ring.

8. A method of repairing a broken-off overflow tube nipple of a radiator mouth assembly as claimed in claim 1 and wherein the radiator mouth assembly is generally tubular having an open end portion for receiving coolant and a body portion from which the overflow tube nipple projects and where in step a) a predetermined amount of the broken-off end portion is removed so that remaining stub of the nipple projects a predetermined distance from the body portion of the radiator mouth assembly to substantially flat and smooth prepared end.

9. A method of repairing a broken-off overflow tube nipple of a radiator mouth assembly as claimed in claim 8 and wherein the replacement overflow tube nipple has a threaded end and wherein step b) comprises threading the threaded end of the replacement overflow tube nipple into the prepared end portion of the remaining stub.

10. The method of claim 9 and wherein the replacement overflow tube nipple has a shoulder that is drawn against the prepared end portion of the remaining stub as the replacement nipple is threaded therein and wherein step b) further comprises locating a gasket between the end portion of the remaining stub and the shoulder of the replacement overflow tube nipple to seal against coolant leaks.

11. The method of claim 9 and wherein step b) further comprises tapping the overflow tube nipple to provide internal threads for receiving the threaded end of the replacement overflow tube nipple prior to threading the replacement overflow tube nipple into the prepared end portion.

12. A method of repairing a radiator overflow tube nipple having a jagged broken end, the method comprising the steps of:

(a) removing the jagged broken end of the overflow tube nipple to form a substantially smooth prepared end thereof and (b) installing a replacement overflow tube nipple projecting from the prepared end for receiving an overflow hose.

13. The method of claim 12 and wherein step (b) comprises installing a treaded boss in the overflow tube nipple such that a portion of the threaded boss projects from the prepared end and threading the replacement overflow tube nipple onto the projecting portion of the threaded boss.

14. The method of claim 13 and further comprising installing a gasket between the replacement overflow tube nipple and the prepared end and threading the replacement overflow tube nipple tightly against the gasket to seal against coolant leakage.

15. The method of claim 12 and wherein step (b) comprises threading the replacement overflow tube nipple into the prepared end.

* * * * *